United States Patent [19]

Hatta et al.

[11] Patent Number: 4,864,530

[45] Date of Patent: Sep. 5, 1989

[54] DISPLAY SYSTEM FOR A COMPACT ELECTRONIC APPARATUS

[75] Inventors: Koichi Hatta; Akira Natsuhara, both of Yamatokoriyama, Japan

[73] Assignee: Sharp Kabushiki Kaisha, Osaka, Japan

[21] Appl. No.: 263,951

[22] Filed: Oct. 26, 1988

Related U.S. Application Data

[63] Continuation of Ser. No. 18,823, Feb. 24, 1987, abandoned, which is a continuation of Ser. No. 704,330, Feb. 22, 1985, abandoned.

[30] Foreign Application Priority Data

Mar. 13, 1984 [JP] Japan ................................. 59-49566
Mar. 13, 1984 [JP] Japan ................................. 59-49567

[51] Int. Cl.$^4$ ............................................. G06F 11/30
[52] U.S. Cl. ................................................. 364/900
[58] Field of Search ... 364/200 MS File, 900 MS File, 364/300

[56] References Cited

U.S. PATENT DOCUMENTS

| 3,371,321 | 2/1968 | Adams | 364/900 |
| 3,623,157 | 11/1971 | Stapleford | 364/900 |
| 3,974,482 | 8/1976 | Balashov et al. | 364/900 |
| 4,213,189 | 7/1980 | Mueller et al. | 364/900 |
| 4,456,973 | 6/1984 | Carlgren et al. | 364/900 |

Primary Examiner—Gary V. Harkcom
Assistant Examiner—Christopher H. Lynt
Attorney, Agent, or Firm—Flehr, Hohbach, Test, Albritton & Herbert

[57] ABSTRACT

An electronic apparatus such as a compact computer stores a certain set of information which is useful in its operation such as a list of character codes and corresponding characters or the names of commands that can be used and the methods of using them. Such information can be displayed by entering a specified command or a character string with one or more characters, including a help requesting key.

1 Claim, 10 Drawing Sheets

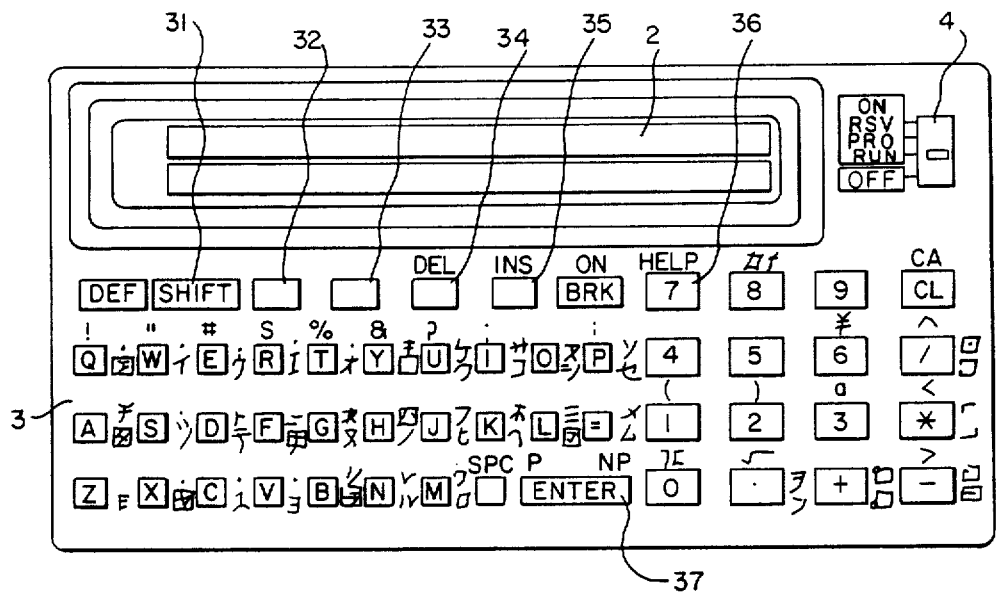
FIG.—1
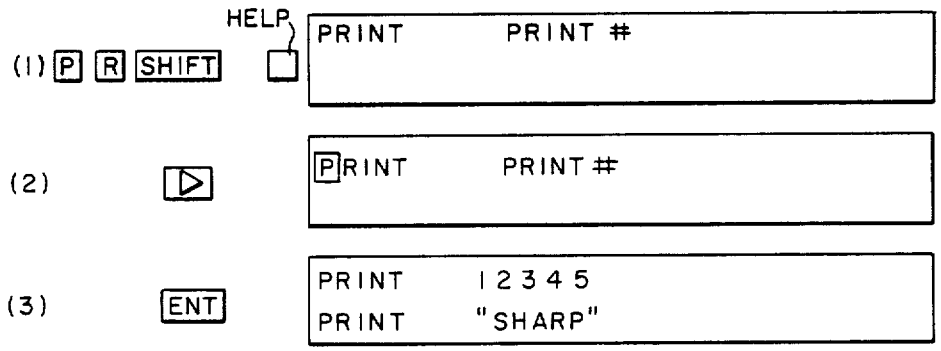
FIG.—5
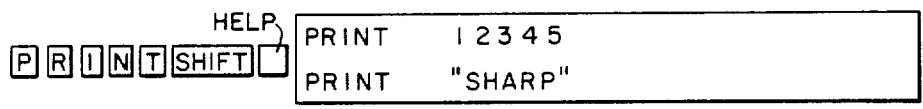
FIG.—6

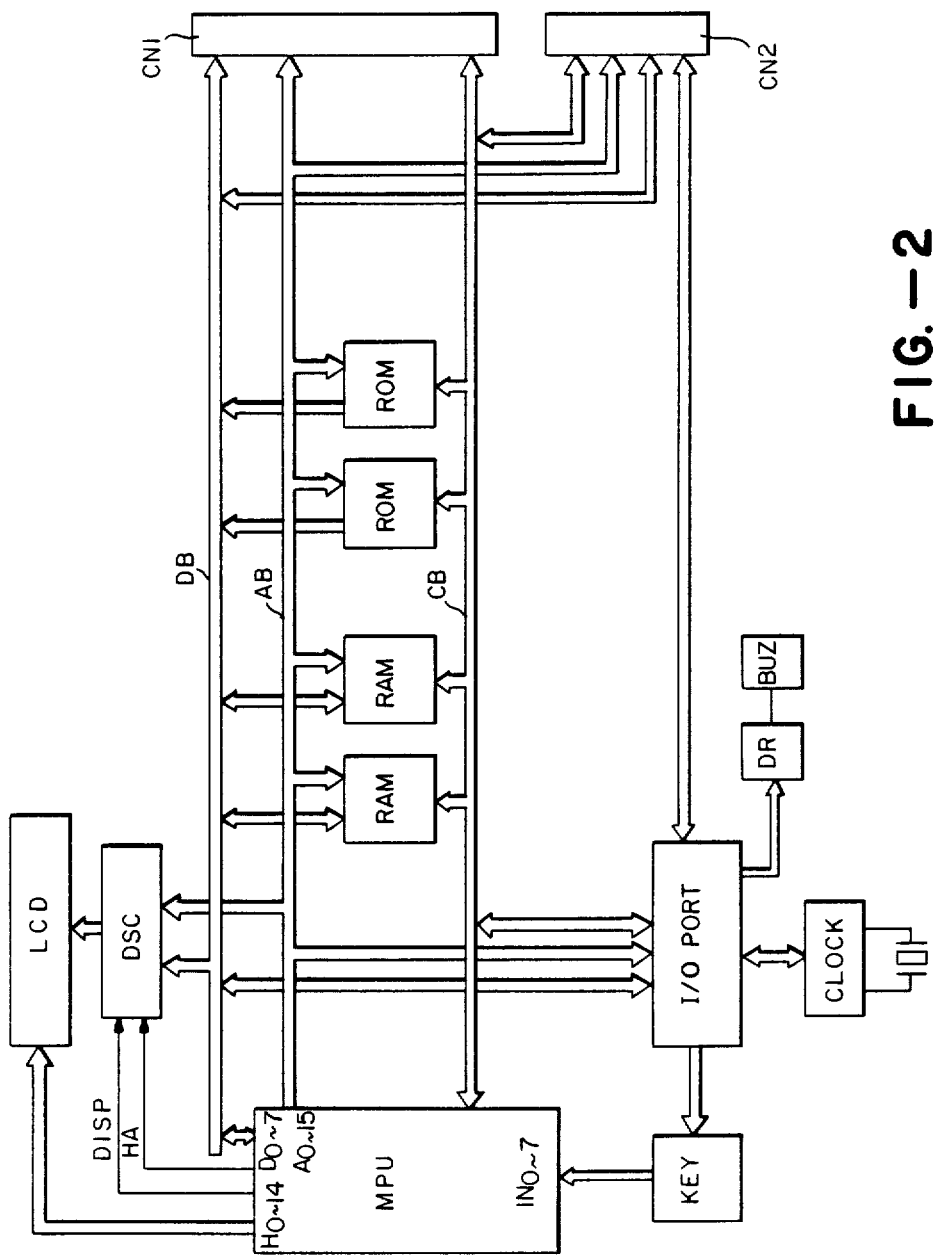
FIG.—2

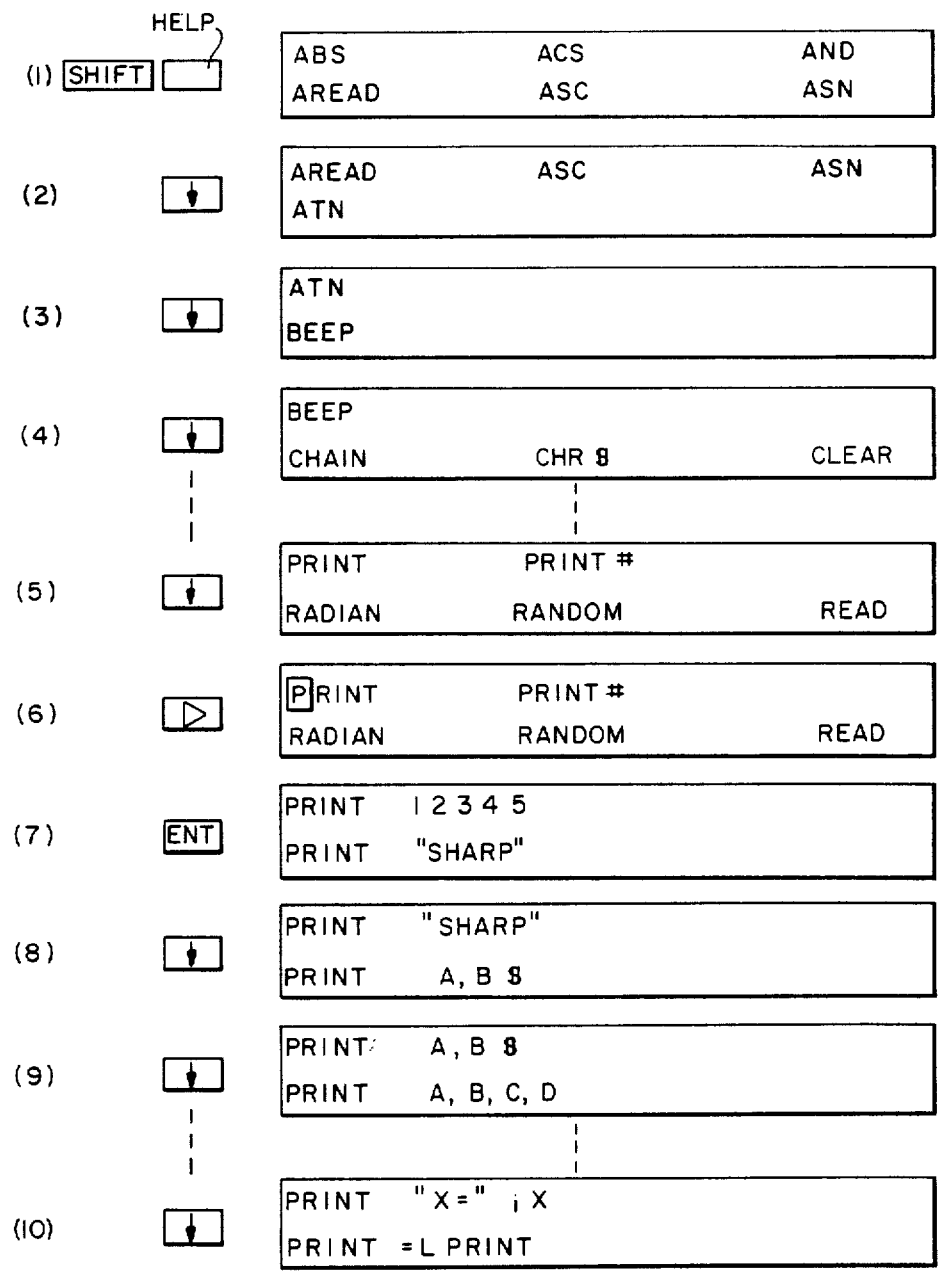
FIG. — 3

(1) [P] [SHIFT] [HELP]

| PASS | PAUSE | PI |
|---|---|---|
| PRINT | PRINT # | |

(2) [▷]

| [P]ASS | PAUSE | PI |
|---|---|---|
| PRINT | PRINT # | |

(3) [▷]

| PASS | [P]AUSE | PI |
|---|---|---|
| PRINT | PRINT # | |

(4) [▷]

| PASS | PAUSE | [P]I |
|---|---|---|
| PRINT | PRINT # | |

(5) [▷]

| PASS | PAUSE | PI |
|---|---|---|
| [P]RINT | PRINT # | |

(6) [ENT]

| PRINT | 1 2 3 4 5 |
|---|---|
| PRINT | "SHARP" |

|   |   |   |
|---|---|---|
| (1) | [A][S][C][I][SHIFT] with HELP | |
| (2) | 2 : 0123456789ABCDEF / !"#$%&'()*+,-./ | → |
| (3) | 3 : 0123456789ABCDEF / 0123456789:;<=>?. | → |
| (4) | 4 : 0123456789ABCDEF / @ABCDEFGHIJKLMNO | → |
| (5) | 5 : 0123456789ABCDEF / PQRSTUVWXYZ[¥]^_ | --- |
| --- | --- | --- |
| (5) | D : 0123456789ABCDEF / ﾐﾑﾒﾓﾔﾕﾖﾗﾘﾙﾚﾛﾜﾝﾞﾟ | → |
| (6) | F : 0123456789ABCDEF / ０♥♦♣♤♡◇♧×✓ | → |
| (7) | D : 0123456789ABCDEF / ﾐﾑﾒﾓﾔﾕﾖﾗﾘﾙﾚﾛﾜﾝﾞﾟ | → |

FIG.—8

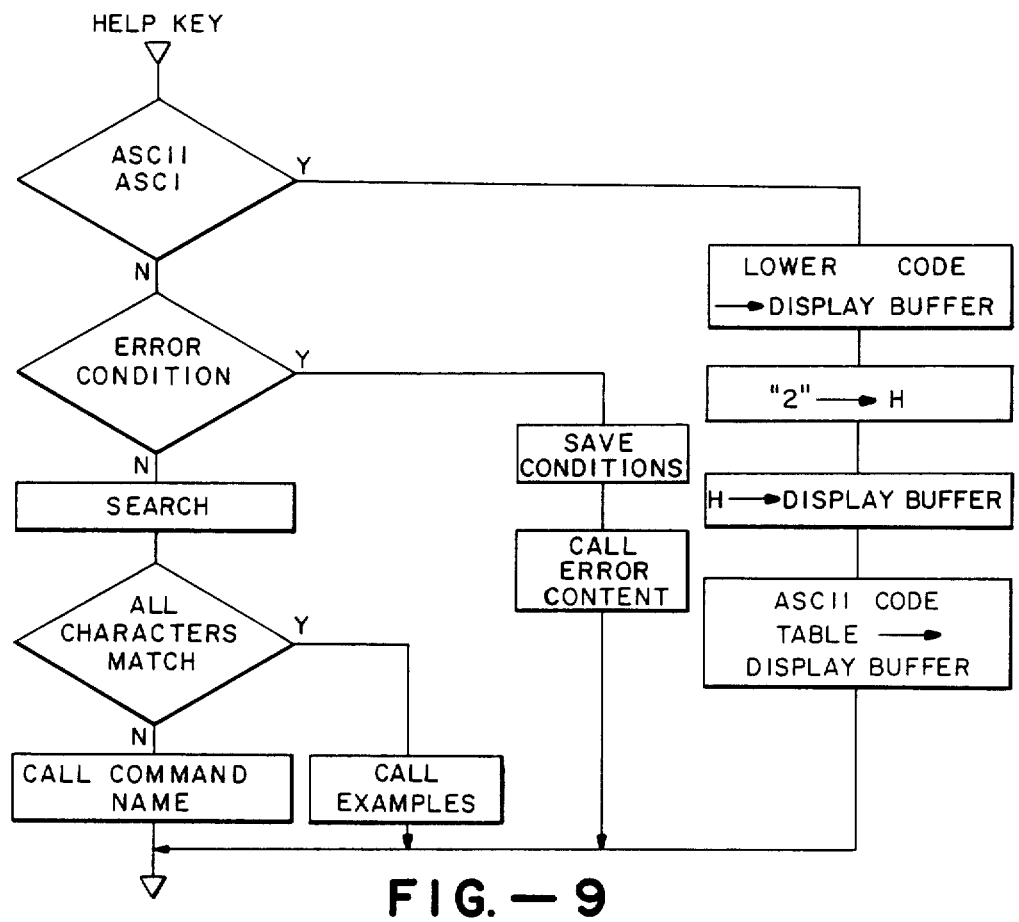
FIG.—9
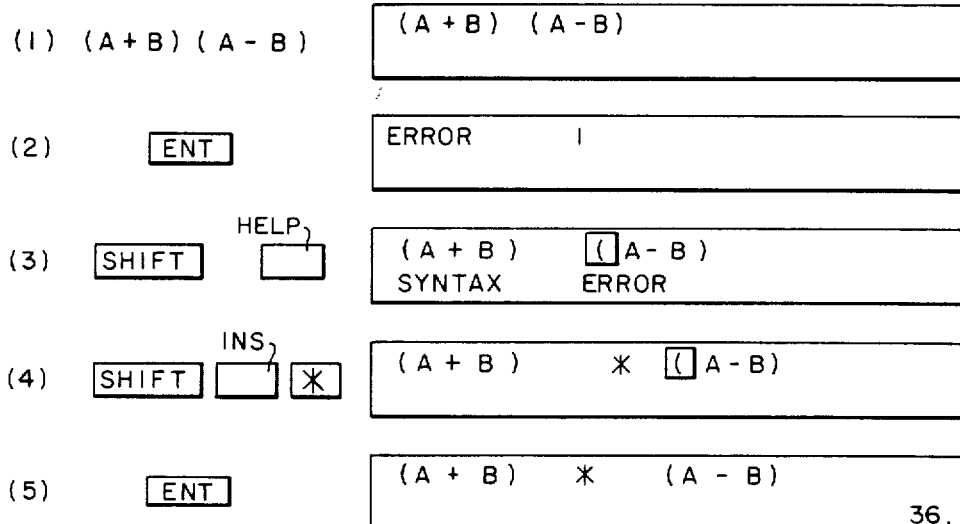
FIG.—14  (A=10, B=8)

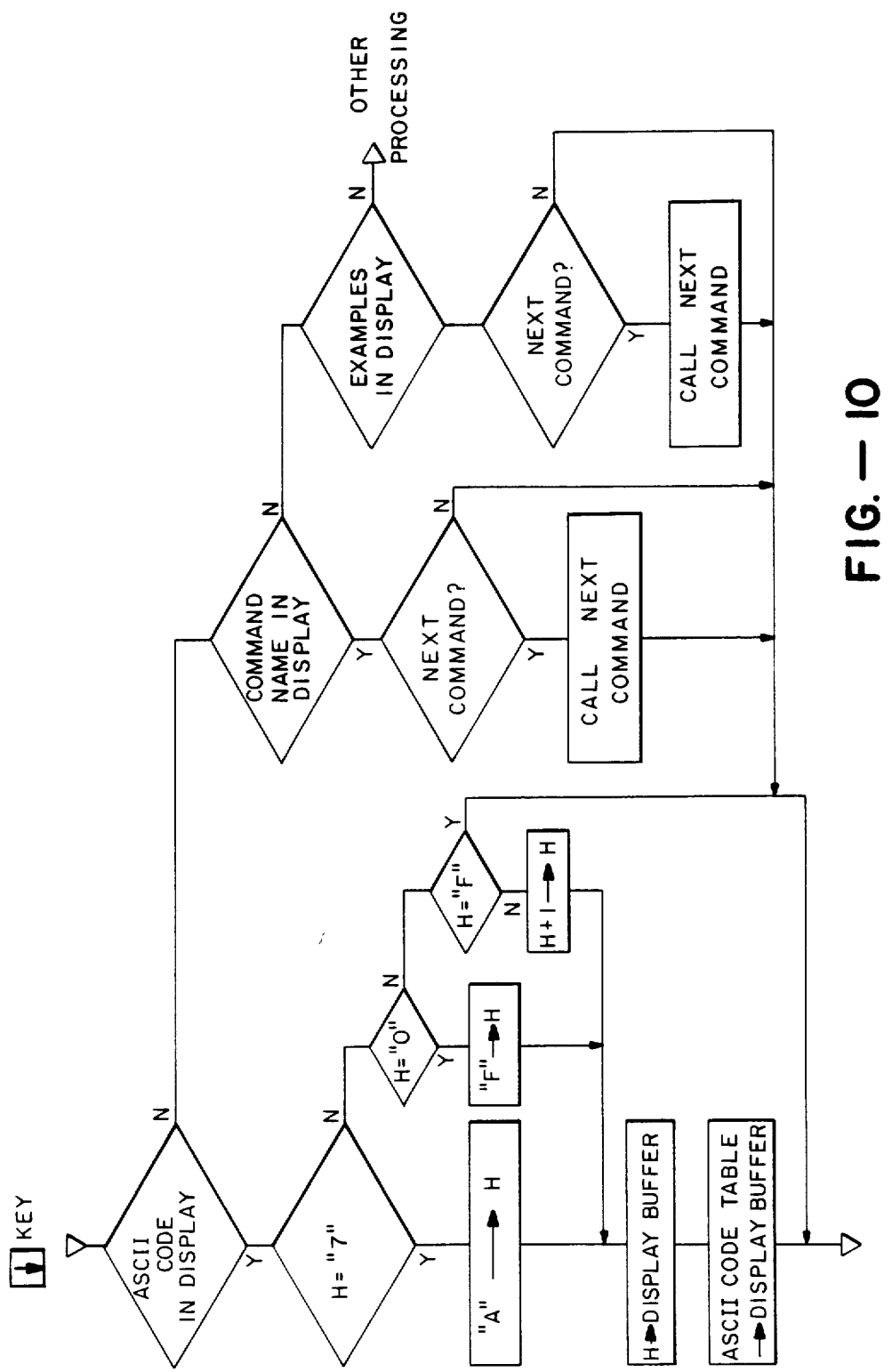
FIG.—10

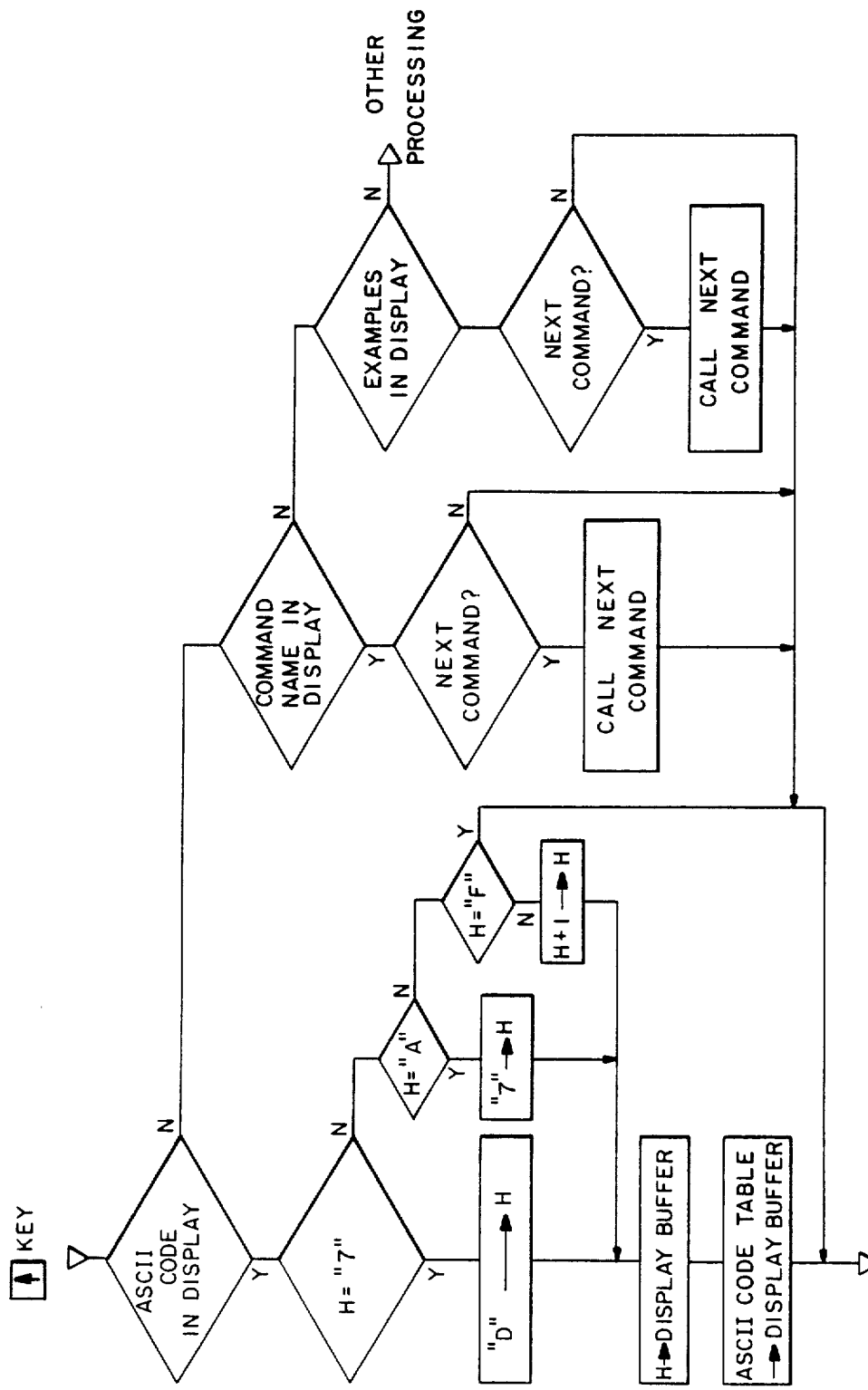
FIG.—11

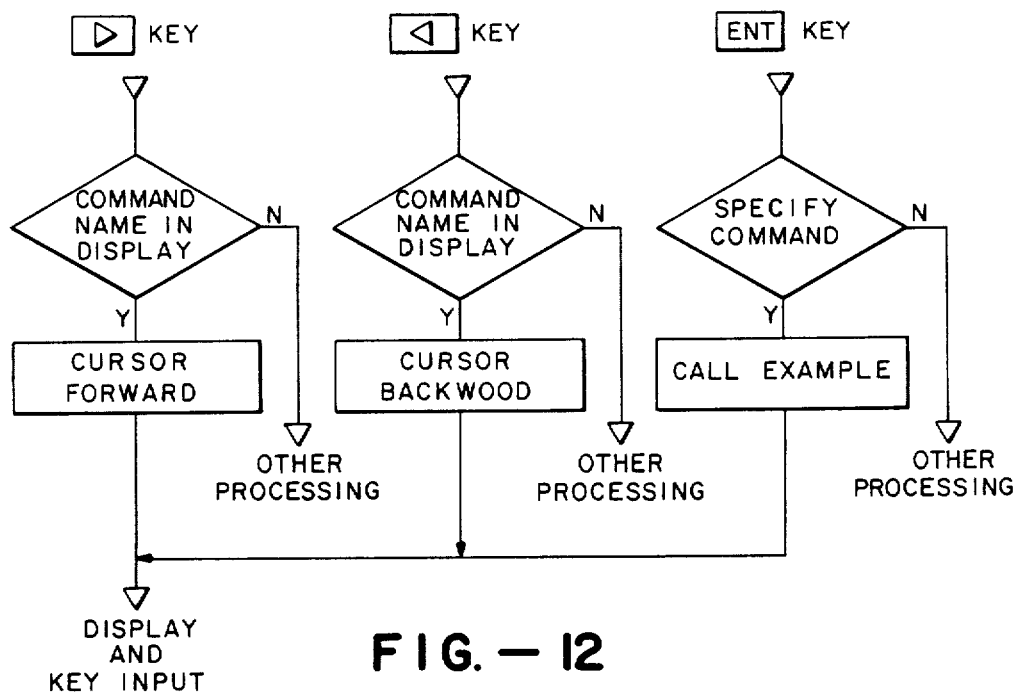
FIG. — 12
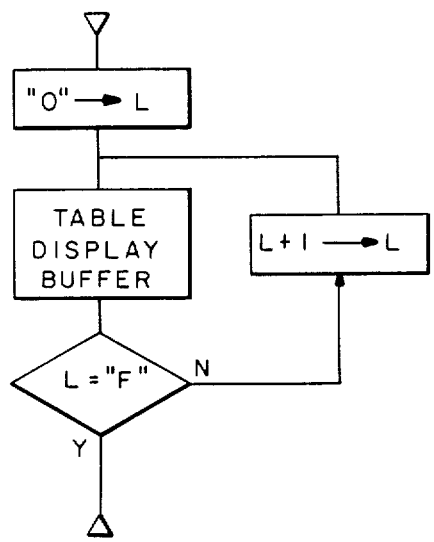
FIG. — 13

DISPLAY SYSTEM FOR A COMPACT ELECTRONIC APPARATUS

This application is a continuation of Ser. No. 018,823 filed Feb. 24, 1987 which is now abandoned and is a continuation of Ser. No. 704,330 filed Feb. 22, 1985 which is now abandoned.

This invention relates to program operators such as pocket-size calculators or personal computers and more particularly to an electronic computer which is adapted to display in its display means a list of character codes and corresponding characters or names of commands and methods of using them when a specified command or a character string is inputted.

Computers of this type are usually used with the help of a manual. When the user gets accustomed to the computer, however, such a manual becomes unnecessary in most situations. Frequently, a reference card or a simple manual called a quick reference is sufficient and more convenient than a regular manual. It is therefore an object of this invention to provide an electronic apparatus such as a pocket-size computer which contains within itself a simplified manual of the aforementioned type or, in particular, a list of commands and the method of using them so that information regarding any of these commands can be retrieved whenever necessary by specifying one or more characters.

It is another object of this invention to provide an electronic computer which contains within itself a table showing the relationship between character codes and characters so that such relationship can be retrieved whenever necessary by the operation of a key.

An electronic computer of this invention is characterized in that certain display information is stored therein in advance so that it can be displayed by the input of a special command. For example, names of commands to be used and examples showing how to use them may be stored in advance so that, if a number of characters which begin to spell the name of a desired command is specified, all commands with names starting with the specified character string will be displayed and further that a desired command may be selected for displaying how to use this command by examples.

BRIEF DESCRIPTION OF THE DRAWINGS

FIG. 1 is a plan view of the exterior of a pocket-size computer embodying this invention.

FIG. 2 is a block diagram showing the system structure of this computer.

FIGS. 3–7 show examples of key operations and displays

FIG. 8 is a table of ASCII codes.

FIGS. 9–13 are flow charts for various processes.

FIG. 14 shows another example of key operations and displays.

An external view of a pocket-size computer according to the present invention is shown in FIG. 1 wherein No. 1 is a housing and No. 2 is a display means. The display means 2 has a display capacity of two levels with 24 digits each of liquid crystal dot matrix. No. 3 generally shows an input section including a SHIFT key 31, a "cursor down" key 32, a "cursor up" key 33, a "cursor left" key 34, a "cursor right" key 35, a HELP key 36 and an ENTER key 37. No. 4 is a switch for power and mode selection.

FIG. 3 shows an example of key operations and displays. Step (1) illustrates the operation of the HELP key 36, or when the keys 31 and 36 of FIG. 1 are operated in this sequence. When this is done, command names are displayed in alphabetical order. If the "cursor down" key 32 is pressed, subsequent command names are displayed [(2)-(5)]. If the "cursor right" key 35 is pressed at this stage, a cursor display takes place at the first letter P of command name PRINT (6). The box around character P indicates that this character is caused to blink. If the ENTER key 37 is pressed at this point after command name "PRINT" has been selected, examples of using this command are displayed (7). If the "cursor down" key 32 is operated, further examples of use of this command can be displayed [(8)-(10)].

FIGS. 4 and 5 show examples where the first character or the first two characters of the desired command name are specified, respectively. If only one character "P" is specified as shown in FIG. 4, command names starting with "P" are displayed (1). If the user keeps pressing the "cursor right" key 35 until the cursor comes to the desired command name (PRINT) [(2)-(5)-]and then presses the ENTER Key 37, examples of these use of this command is displayed (6).

FIG. 5 shows an example where two characters "PR" are specified. In this example, there are only two commands starting with "PR" (PRINT and PRINT#). Fig. 6 shows an example where the complete name of a desired command (PRINT) is entered. In this case, examples of its use are immediately displayed.

FIG. 7 is an example of displaying the relationship between ASCII codes and characters. If "ASCI" or "ASCII" is entered and the HELP key 37 is pressed, a portion of the ASCII code table is displayed (1). The upper level (0–F) represents the last four bits while the value on the left-hand side in the lower level represents the top four bits by hexadecimal code. For example, (21)H means "!" and $(24)_H$ means "$". The value of the top four bits can be changed by pressing the "cursor down" key 32 or the "cursor up" key 33.

FIG. 8 shows the ASCII code table. Fundamentally, from $(00)_H$ to $(FF)_H$ can be regarded as codes but there are codes that cannot be used as a display character. For example, $(80)_H$ to $(9F)_H$ and $(EO)_H$ to $(EF)_H$ are not displayed. They are skipped as shown in (5), (6) and (7) of FIG. 7.

FIG. 14 shows an example of operation of the HELP key when an error occurred during a manual calculation. The error number displayed in Step (2) is for showing the type of the error and the user can learn by pressing the HELP key that it is a syntax error. The position of the error is indicated by the cursor. In this example, the cursor is showing that a multiplication operator "*" is required at this position. The desired result can be obtained by effecting the necessary correction as shown in Steps (4) and (5). In this example, it is a assumed given that A=10 and B=8.

The control for effecting the operations described above is explained next. FIG. 2 is a block diagram to show a system structure wherein LCD is a display means comprising a liquid crystal display element and character display in the display means or illumination of symbol segment is controlled by a display control means DSC. KEY represents a key input section. Strobe signals are inputted from an input/output port I/O PORT and key return signals are outputted to a microprocessor unit MPU.

Read-write memories RAM are used as various registers, flags and buffers and stores programs, etc. Interpreters for executing programs and other control programs are stored in advance in read-only memories ROM. $CN_1$ is a connector for connecting memories RAM and ROM as a module. These memories are connected to an address bus AB, a data bus DB and a control bus CB.

The I/O PORT is also connected to these buses and functions as an interface to MPU. The system further includes a buzzer BUZ which is activated by a driver circuit DR. CLOCK is a clock circuit. The I/O port inputs and outputs signals to and from these I/O units, or it outputs key strobe signals to the key input section KEY, inputs and outputs time data to and from the clock circuit CLOCK and outputs drive signals to the buzzer driver circuit DR. $CN_2$ is a connector for connecting externally I/O units such as a data recorder and a printer as well as an extended storage.

The microprocessor unit MPU is adapted to output synchronous signal HA and ON/OFF display signal DISP to the display control means DSC and back plate signals $H_{0-14}$ to the display means. The display control means DSC contains internally display memories in a bit-by-bit correspondence with the individual segments of the display LCD. In other words, desired characters and symbols can be displayed if a bit pattern corresponding to the display pattern is written in these display memories.

FIG. 9 is a flow chart which shows the system operation when the HELP key is pressed. It is determined first of all whether or not the content of the key input buffer is "ASCII" or "ASCI", and also if the system is in an error condition. If the answers thereto are both negative, a search for a command name follows on the basis of the content of the key input buffer. When all characters match, examples of use are retrieved as shown in FIG. 6. If not, corresponding command names are retrieved.

Command names are stored in advance as character arrays arranged in an alphabetical sequence, each command name being assigned an address which shows the memory location of its examples. An address table by the initial character is also used for the search of command names.

FIG. 10 shows the processing when the "cursor down" key is pressed while a command name is displayed. When this takes place, it is determined whether or not there is a command name to be displayed next and, if there is, it is retrieved and placed in the display buffer. If there is not, there will be no operation. Similarly, if the "cursor up" key is pressed, determination is made regarding whether there is a command name to be displayed next, moving backwards against the alphabetical sequence. This is illustrated in FIG. 11. FIG. 12 shows that the cursor moves forward or backward respectively if the "cursor right" or "cursor left" key is pressed while a command name is being displayed.

If the HELP Key is pressed after "ASCII" or "ASCI" is entered into the key input buffer, ASCII codes $(30)_H$–$(39)_H$ and $(41)_H$–$(46)_H$ for 0–F representing the lower four bits are inputted into the area corresponding to the upper level of the display means of the display buffer as shown in FIG. 9. The initial value "2" (0010) representing the upper four bits is 10 subsequently entered into the counter H and the content of H, that is, ASCII code $(32)_H$ for "2" is inputted into the area which corresponds to the lower left-hand side of the display means of the display buffer. The ASCII codes of specified areas are read from the ASCII code table and sequentially inputted into the area corresponding to the lower right-hand side of the display means of the display buffer.

FIG. 13 illustrates the aforementioned procedure more in detail wherein L represents the lower four bits and the content of the ASCII code table specified by H and L is retrieved and inputted into the display buffer. If the "cursor down" key is pressed during the display of such an ASCII code, the value of H, or the upper four bits, is "counted up", or increased by one except when H is "7", it will not be changed to "8" but to "A" and when H is "D", it will not be changed to "E" but to "F" as shown in FIG. 10. If the "cursor up" key is pressed, on the other hand, the value of H is "counted down" except, when H is "F", it is not changed to "E" but to "D" and, when H is "A", it is not changed to "9" but to "7" as shown in FIG. 11.

If the HELP key is pressed in an error condition, the contents of display and other conditions at that time are saved as shown in FIG. 9 and a message describing the type of the error is retrieved and inputted into the display buffer.

In summary, the electronic apparatus according to this invention is made extremely easy to use because convenient information such as how to use various commands and the relationship between character codes and characters can be retrieved and displayed whenever necessary by means of a simple key operation.

What is claimed is:

1. An electronic apparatus comprising
   a display means,
   an input means for entering a specified command, said input means including a help requesting key,
   a memory means storing a list of character codes and corresponding characters, names of commands which are usable by said apparatus, and examples of using said commands, and
   a control means so programmed that if said help requesting key is operated when there is an error during operation of said apparatus, the type of said error is displayed in said display means and the position of said error is indicated by a cursor in said display means, wherein said input means further includes character keys and cursor moving keys and wherein said control means is also so programmed,
   that, if a request for code-display is made through said input means, a portion of said list of character codes and corresponding characters is displayed in said display means, other portions of said list being displayable by operating said cursor moving keys,
   that, if a charter or string is inputted through a said character keys and said help requesting key is thereafter operated, up to a maximum displayable number of those of said names which are stored in said memory means and start with said inputted character or character string are displayed in said display means, and
   that, if one of said displayed names is specified by operating said cursor moving keys, the example which is stored in said memory means and corresponds to said specified name is displayed in the said.

* * * * *